US006756087B2

(12) United States Patent
Terada

(10) Patent No.: US 6,756,087 B2
(45) Date of Patent: Jun. 29, 2004

(54) METHOD FOR REMOVING ORGANIC COMPOUND BY ULTRAVIOLET RADIATION AND APPARATUS THEREFOR

(75) Inventor: Kazuo Terada, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/188,268

(22) Filed: Jul. 2, 2002

(65) Prior Publication Data

US 2002/0168482 A1 Nov. 14, 2002

Related U.S. Application Data

(62) Division of application No. 09/464,824, filed on Dec. 17, 1999, now Pat. No. 6,468,599.

(30) Foreign Application Priority Data

Dec. 25, 1998 (JP) ............................................. 10-369026
Oct. 29, 1999 (JP) ............................................. 11-309466
Nov. 4, 1999 (JP) ............................................. 11-314345

(51) Int. Cl.⁷ ................................................ B05D 3/06
(52) U.S. Cl. ........................ 427/558; 427/165; 427/532; 427/553
(58) Field of Search ............................... 427/558, 532, 427/553, 165, 167

(56) References Cited

U.S. PATENT DOCUMENTS 4,987,008 A * 1/1991 Yamazaki et al. .......... 438/694
6,099,786 A * 8/2000 Hu et al. .................... 264/400
6,329,663 B1 * 12/2001 Terada ..................... 250/492.1

FOREIGN PATENT DOCUMENTS

| GB | 2271777 A | | 4/1994 |
|---|---|---|---|
| JP | 141420 | * | 6/1986 |
| JP | 61-141420 | | 6/1986 |
| JP | 4-60519 | | 2/1992 |
| JP | 5-19265 | | 1/1993 |
| JP | 5-273553 | | 10/1993 |
| JP | 5-289039 | | 11/1993 |
| JP | 06148661 A | | 5/1994 |
| JP | 06-202111 | | 7/1994 |
| JP | 06275242 A | | 9/1994 |
| JP | 06-312130 | | 11/1994 |
| JP | 07-288109 | | 10/1995 |
| JP | 09061838 A | | 3/1997 |
| JP | 10-48586 | | 2/1998 |
| JP | 11333394 | | 7/1998 |
| JP | 11183927 A | | 7/1999 |
| JP | 11207171 A | | 8/1999 |
| JP | 11333394 A | | 12/1999 |
| JP | 2000180598 A | | 6/2000 |

* cited by examiner

*Primary Examiner*—Brian K. Talbot
(74) *Attorney, Agent, or Firm*—Scully, Scott, Murphy & Presser; Robert M. Trepp, Esq.

(57) ABSTRACT

An organic polymer film can be completely decomposed and removed from a substrate surface by exposing the film to ultraviolet radiation having a wavelength of 180 nm or less. Also, ultraviolet radiation not longer than 180 nm in wavelength is scarcely transmitted through a transparent conductive oxide such as ITO and, thus, can be used for eliminating a defective polyimide alignment film formed on a color filter substrate and an array substrate having a transparent electrode pattern of ITO formed on the surface of a pigment portion and a TFT structure, respectively. According to the present invention, the defective alignment film on the substrates can be removed completely without any damage such as discoloring of the pigment portion and/or changing the TFT characteristics.

3 Claims, 5 Drawing Sheets

(a)

(b)

(a)

(b)

(a)

(b)

METHOD FOR REMOVING ORGANIC COMPOUND BY ULTRAVIOLET RADIATION AND APPARATUS THEREFOR

CROSS REFERENCE TO RELATED APPLICATION

The present application is a divisional of Ser. No. 09/464,824 filed on Dec. 17, 1999 now U.S. Pat. No. 6,468,599.

BACKGROUND OF THE INVENTION

1. Field of the Invention

The present invention relates to a method of removing an organic polymer film, particularly, to a simple and convenient method of completely removing a polyimide film as an alignment film in the manufacture of a color filter substrate used in a liquid crystal display device. It is absolutely necessary to remove completely the polyimide film for the rework of a color filter substrate. And also, the present invention relates to a method of removing an organic polymer film on an array substrate.

2. Description of the Related Art

The manufacturing process of a cell of a liquid crystal display device includes the step of forming an organic polymer film serving to orient liquid crystal molecules followed by forming a color filter structure or an array structure on a substrate. The organic polymer film includes a film of, for example, polyimide resin (PI) and polyvinyl alcohol (PVA), and is formed on the entire surface of the substrate by a printing method or a spin coating method. Then, the film is baked, followed by applying an aligning process such as rubbing to the baked film so as to form an alignment film. However, where a defect is included in the organic polymer film thus formed, the entire substrate was discarded as a defective substrate. Since the substrate including a color filter structure or an array structure is prepared by employing a manufacturing technology of a very high level in order to achieve a high density and a high precision in a display device, the discarding of the entire substrate, which is defective, leads to an increased manufacturing cost.

In order to improve the situation, it is attempted to once remove the defective film of the organic polymer, followed by newly forming a satisfactory film. As the technique to remove the organic polymer film, some methods now in use for removing a photoresist film in the manufacturing process of a semiconductor device and the like, are applicable. For example, a wet etching is one of the well-known method for removing an organic polymer film in which the organic polymer film is dissolved in an appropriate solvent. In the case of a polyimide film, -butyrolactone, N-methyl pyrrolidone (NMP), etc. are used as the solvent. Even in the case of using such a solvent, it is impossible to remove completely the residual polyimide, with the result that a polyimide film having a thickness of about 10 to 100 is left unremoved on the substrate. Also known is a dry etching method such as a plasma etching method or an ozone ashing method. It may be possible to achieve the complete removal of the residual polyimide film by employing these dry etching methods. However, the dry etching method requires a vacuum apparatus and an exclusive ozone generator. In other words, a relatively costly and complex apparatus and manufacturing step is required in the dry etching method, compared with the other method. Such being the situation, the dry etching method has not yet been put to practical use. The dry etching method gives rise to an additional difficulty. Specifically, it is necessary to rotate or rock the substrate, making it difficult to deal with substrates of various sizes, particularly, a large substrate sized at 600×720 mm.

Japanese Patent Disclosure (Kokai) No. 6-202111 discloses a method of removing a polyimide liquid crystal alignment film. It is disclosed that the film is exposed to ultraviolet radiation having a wavelength of 230 to 300 nm, followed by dipping the film in a polar solvent or an alkaline solvent. However, it has been found that the ultraviolet radiation having a wavelength of 230 to 300 nm is transmitted through the underlying transparent conductive film of ITO (Indium-Tin-Oxide), though the transmission is only several percent, so as to do damage to the pigment contained in the color filter positioned below the ITO film. For example, discoloring is brought about in the pigment.

Also, it has been found that it is impossible to remove completely the polyimide film by only exposure to ultraviolet radiation having a wavelength of 230 to 300 nm.

As described above, it is unavoidable for an organic polymer film on a substrate for a cell of a liquid crystal display device to bear a defect caused by a defective printing or by a damage done during the aligning process such as rubbing. However, it was impossible to remove completely the organic polymer film for reworking the substrate. It is of high importance to develop a cheap and simple method for removing completely the organic polymer film such as a polyimide film attached to the substrate in order to improve the manufacturing yield and to reduce the manufacturing cost of the liquid crystal display device.

SUMMARY OF THE INVENTION

An object of the present invention is to provide a simple and convenient method of completely removing an organic polymer film on a substrate.

Another object of the present invention is to provide a simple and convenient method of completely removing a polyimide film used as an alignment film but being defective in the manufacture of a color filter substrate and an array substrate for a liquid crystal display device. The complete removal of the defective polyimide film is absolutely necessary for the reworking of the substrate. It follows that an additional object of the present invention is to provide a method which permits improving the manufacturing yield of a cell of a liquid crystal display device.

Still another object of the present invention is to provide a simple and convenient apparatus for completely removing an organic polymer film on a substrate.

According to the present invention, an organic polymer film, which is to be removed from a substrate surface, is exposed to ultraviolet radiation having a wavelength of 180 nm or less so as to decompose and remove the organic polymer film. This particular removing method is useful for removing an alignment film comprising an organic polymer such as polyimide to rework the substrate.

The principle of the removing method is shown in FIG. 1. To be more specific, the film is considered to be removed by a breaking function, that is, each bond of organic polymer in the film is broken by the energy of the irradiated ultraviolet radiation, and by an oxidizing function performed by oxygen within the air atmosphere, which is excited by the energy of the ultraviolet radiation. In general, the coupling energy (eV/molecule) between adjacent atoms contained in an organic molecule is mainly: C—N bond (3.02); C—C bond (3.60); C—H bond (4.29); and C=C-bond (6.29). The energy (E) of the ultraviolet radiation is determined by:

$$E = hc/e\lambda$$

where h represents the Planck's constant ($6.626 \times 10^{-34}$ [J-sec]), c represents the speed of light ($2.998 \times 10^8$ [m/sec]), e represents the energy of a single electron ($1.602\times10^{-19}$ [J/eV]), and 2 represents the wavelength of the light [m]. The energy of the ultraviolet radiation emitted from a conventional low pressure mercury lamp having an output wavelength of 254 nm is 4.88 eV, which is smaller than the coupling energy of the C=C bond noted above. In other words, it is impossible for the ultraviolet radiation having a wavelength of 254 nm to break the C=C bond. It follows that the pyromellitic acid portion and the condensed ring portion of the polyimide structure given below are not decomposed but remain on the substrate:

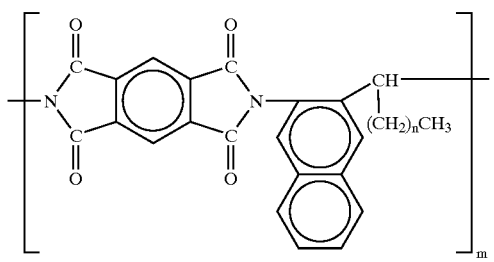

On the other hand, ultraviolet radiation having a wavelength of 180 nm is capable of imparting an energy of 6.89 eV that is large enough to break the C=C bond. Therefore, the interatomic bonds included in almost all the organic polymer or molecule can be broken and thus the organic polymer or molecule can be decomposed.

Also, the oxygen molecules within the atmosphere generate excited oxygen atoms O* when exposed to ultraviolet radiation as shown below:

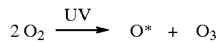

The excited oxygen atom O* readily reacts with each of the atoms and atomic groups broken by irradiation of the ultraviolet radiation and convert atoms of C, N and H into molecules of $CO_2$, $NO_x$ and $H_2O$. These molecules are gaseous and, thus, can be moved from the substrate into the atmosphere. It follows that these gaseous molecules can be removed easily by discharging the atmosphere from within the chamber. Alternatively, the excited oxygen atom is considered to attack directly the organic polymer so as to oxidize the particular material and, thus, to generate the similar gaseous oxide molecules.

However, the high energy of the ultraviolet radiation having a wavelength shorter than 180 nm may do damage to the substrate. For example, it is possible for the particular ultraviolet radiation to decompose even the useful material contained in the structure below the film of the organic polymer. For example, if the pigment portion is exposed directly to ultraviolet radiation in the color filter substrate included in a liquid crystal display device, the pigment portion suffers from a damage such as discoloring. It should be noted in this connection that a transparent electrode pattern made of ITO or IZO (Indium-Zinc-Oxide) is formed on the surface of the pigment portion in the ordinary color filter substrate. It has been found, however, that ultraviolet radiation having a wavelength not longer than 180 nm is scarcely transmitted through the particular transparent electrode pattern, with the result that the particular electrode pattern acts as a protective film of the pigment portion. Thus the method of the present invention makes it possible to remove easily the polyimide alignment film on a substrate including a color filter structure.

On the other hand, the typical array structure as shown in FIG. 4(a) for a liquid crystal display device is adversely effected by the directly exposure to ultraviolet radiation, transistor characteristics of the semiconductor layer are shifted, and electrification will be occurred in the gate insulating layer. In particular, TFT characteristics are changed such as that the gate threshold voltage is decreased and that the drain off current is increased. As the result, maintaining the charge at the TFT is leaked to make a white spot on the display and to lead a poor display quality. However, an array structure having a polymer film on the array (it is called as PFA structure or PFA substrate, hereafter) as shown in FIG. 4(b) which has a ITO or IZO film on the surface of the TFT element may avoid the damage by exposure to the ultraviolet radiation, because the lower semiconductor layer can be protected by the ITO or IZO film. This PFA structure is developed in order to increase the aperture ratio by the structure having a transparent electrically conductive film which acts a role of a gate line, on the TFT structure through an organic insulating layer. Therefore, the removing of the polyimide alignment film on the substrate having PFA structure is easily achieved by the present invention.

The thickness of the ITO or IZO film formed on these substrates is approximately 1500 angstrom to maintain the high transparency in the visible light but it is sufficient to shield the ultraviolet radiation having a wavelength of 180 nm or less.

Furthermore, in light of the above principle, it is easily understood that the object to be decomposed and removed is not only polymer but also any organic molecules. An example of such organic molecules is a contamination attached on the substrates during manufacturing process. Thus, the removing method and the apparatus can be applied to removing a residue of resist composition, a residue after typical cleaning and a surface contamination in the manufacturing process for not only LCD but also microelectronics or semiconductor device.

DETAILED DESCRIPTION OF THE INVENTION

In the present invention, a film of an organic polymer on a substrate, which should be removed, is exposed to ultraviolet radiation having a wavelength of 180 nm or less to decompose and remove the film of the organic polymer.

Figure 1:
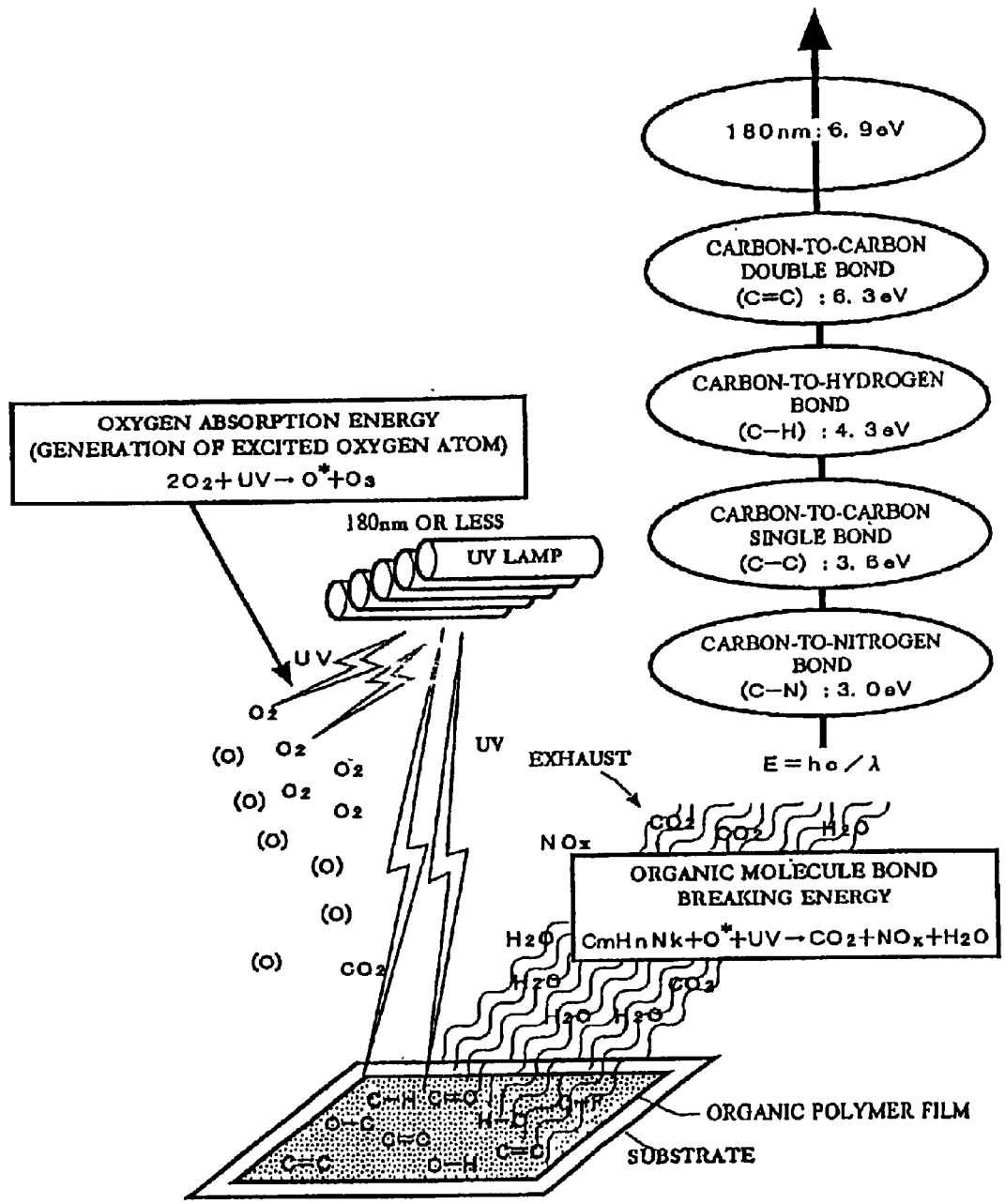
FIG. 1 shows the principle utilized in the present invention.
Figure 2:
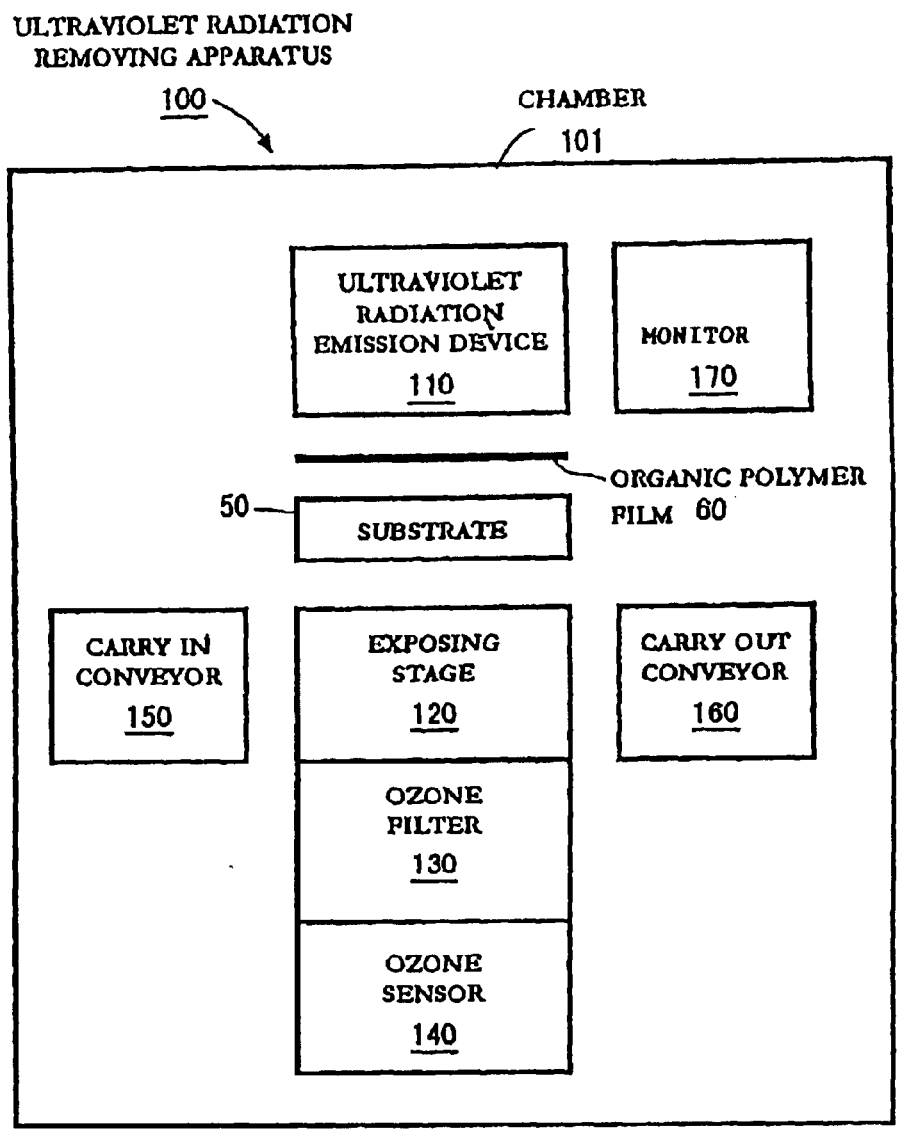
FIG. 2 schematically shows a removing apparatus adapted to work the present invention.

FIG. 2 schematically shows an apparatus 100 for working the present invention. The apparatus 100 comprises a chamber 101. As shown in the drawing, arranged within the chamber 101 are ultraviolet radiation emitting device 110, an exposing stage 120 on which a substrate 50 is mounted so as to permit the substrate 50 to be located at an exposing position, an ozone filter 130 for removing with safety the ozone $O_3$ generated by the ultraviolet radiation irradiation, and an ozone sensor 140. Further, it is desirable to arrange within the chamber 101 a transfer conveyor 150 for transferring the substrate bearing a film of an organic polymer or an organic compound to be removed into the chamber 101 and another transfer conveyor 160 for transferring the substrate having the film of the organic polymer or the organic compound removed therefrom out of the chamber 101. It is also desirable to arrange, optionally, within the chamber 101 a monitor 170 adapted to monitor the completion of the removal of the organic polymer film or the organic compound.

The ultraviolet radiation emitting device 110 useful in the present invention emits only ultraviolet radiation having a wavelength of 180 nm or less. The output power of the device 110, which depends on the kind and thickness of the organic polymer film or the organic compound to be removed, should be at least about 4 mW/cm$^2$, preferably at least about 8 mW/cm$^2$. The ultraviolet radiation emitting device meeting the particular condition includes, for example, an "Excimer Lamp" (trade name) available from Ushio Denki K. K. (Otemachi 2-6-1, Chiyoda-ku, Tokyo) and Hoya Shot K. K. (Shinjuku 3-23-7, Shinjuku-ku, Tokyo). The Excimer Lamp emits ultraviolet radiation having a wavelength of 172 nm with an output power of 4 to 30 mW/cm$^2$. In addition, it is also possible to use a D2 lamp (deuterium lamp), an argon lamp, a krypton lamp, etc.

As shown in chemical formula 2 given previously, the oxygen molecules within the atmosphere of the chamber generates ozone together with excited oxygen atoms upon exposure to ultraviolet radiation. The ultraviolet radiation having a wavelength of 172 nm which is used in the present invention exhibits high energy as described above. Then, it can be seen that ozone and excited oxygen atoms are generated in concentration over than 1000 ppm just under the ultraviolet radiation emitting device, upon emitting in an atmosphere. This ozone concentration is sufficient enough to remove any organic compound usually, and an additional ozone generator will not be necessary to working the subject invention. As known to the art, ozone is strongly poisonous and harmful to the human body, making it necessary to decompose the ozone within the chamber so as to be converted into a safe substance before the atmosphere within the chamber is discharged to the outside. It follows that it is necessary to use the ozone sensor 140 for monitoring the ozone concentration within the chamber and the ozone filter 130 for disposing of the ozone with safety. A known ozone sensor and a known ozone filter can be used in the present invention. It is also necessary to seal sufficiently the chamber 101 in order to prevent the ozone from leaking to the outside of the chamber 101. On the other hand, it should be noted that oxygen molecules within the atmosphere of the chamber 101 are consumed during removal of the organic polymer film or the organic compound to be removed so as to increase the oxide compounds formed by the decomposition such as $CO_2$, $NO_x$ and $H_2O$, making it necessary to use a suction-discharge means (not shown) to maintain constant the atmosphere within the chamber.

The exposing stage 120 for transferring and supporting the substrate and the carry in conveyor 150 and the carry out conveyor 160 are known to the art. The exposing stage 120 includes an X-Y stage and a Z-stage that can be moved in the horizontal and vertical directions and can be fixed at a suitable position for setting the exposing position.

A heater adapted to heat the substrate can be used optionally. The rate of removing the organic compound is accelerated around three times if the substrate is heated at a temperature of 100–120 degrees C. As the heater, hot plate or electric heating wire combined with the exposing stage in order to control the temperature at a surface of the exposing stage where the substrate is placed, may be useful. And, the chamber with a heater and a temperature controller in order to control the temperature in the chamber entirely may be also useful.

The monitor 170 may be, for example, of the type that irradiates the surface of the substrate with an electromagnetic radiation such as an infrared ray so as to obtain the information of the substrate surface by the spectrum of the reflected radiation or the scattered radiation, or the type that is designed to measure the concentrations within the chamber of the substances such as $CO_2$ and $NO_x$, which are formed as a result of decomposition of the film of the organic polymer or the organic compound upon exposure to ultraviolet radiation. Since exposure of the substrate to an excessive amount of ultraviolet radiation may cause an undesirable damage to the substrate, it is desirable to finish the exposure at the time when the film of the organic polymer has been removed completely. For that purpose, it is possible to design the apparatus to transmit a signal to the emitting device 110 to finish the emission when the monitor 170 has detected the completion of the removal.

Instead of the monitor mentioned above, a photometer which indicates a dose emitted by the ultraviolet emitting device can be provided. In this situation, the exposing duration is determined by the total doses of the ultraviolet radiation.

The present invention is useful for particularly the reworking of the substrate that includes the removal of the polyimide alignment film on the color filter substrate for a liquid crystal display device. Although manufacture of a color filter substrate is described herein as an example, it may be of no difficulty for those skilled in the art to understand that the technical idea of the present invention can also be applied to the removal of a film of an organic polymer on another substrate.

Figure 3:
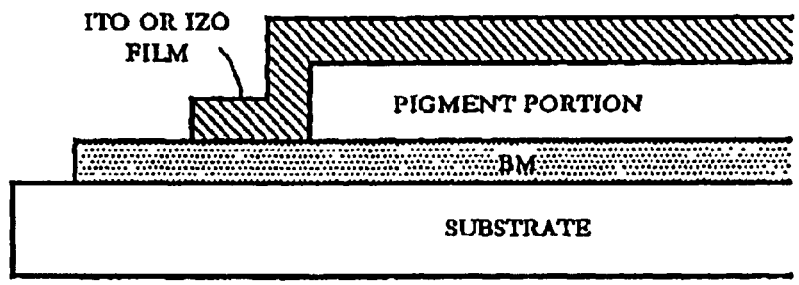
FIG. 3 is a cross sectional view schematically showing the structure of a color filter substrate.
Figure 4:
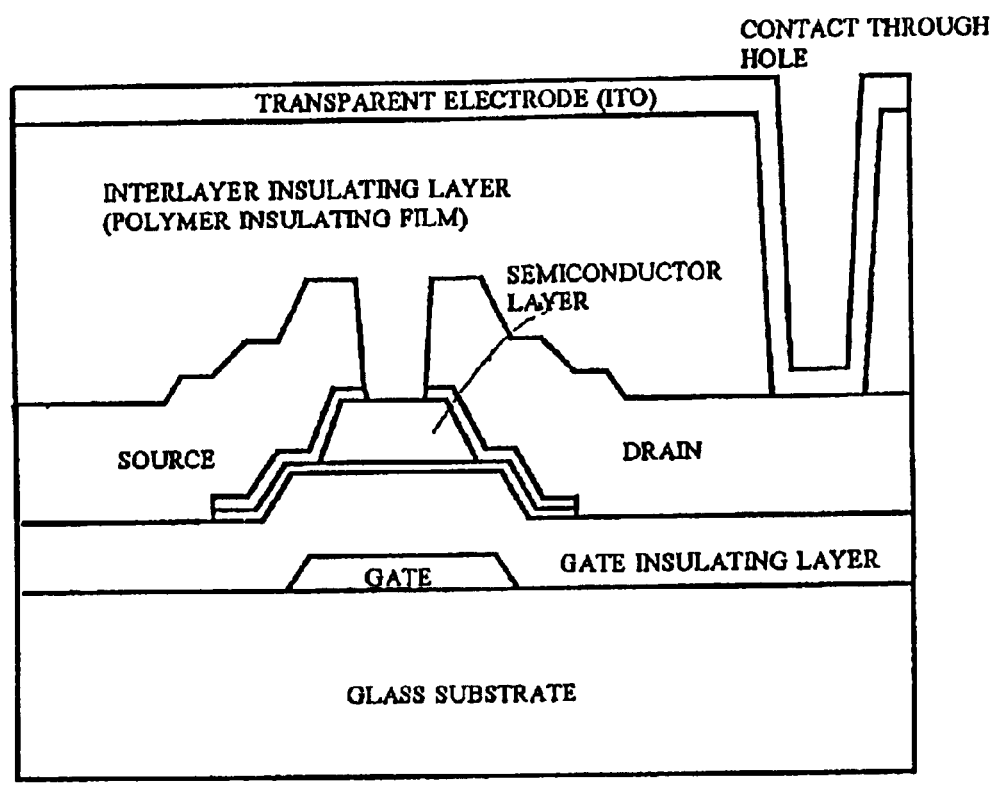
FIG. 4 is a cross sectional view schematically showing the structure of an array substrates, which are (a) a conventional structure of TFT array substrate without a polymer film and a transparent electrode and (b) a PFA structure of TFT array substrate having a polymer film and a transparent electrode.
Figure 4:
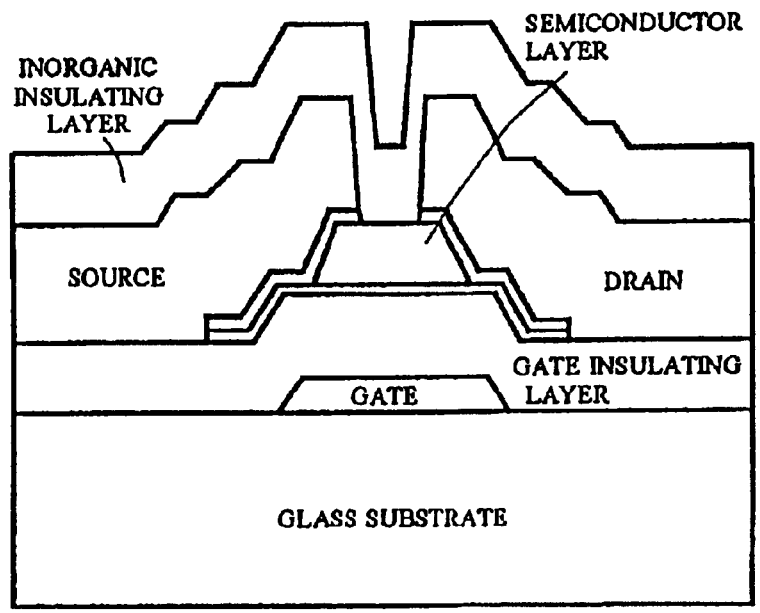

FIG. 3 shows the structure of a typical color filter substrate for a liquid crystal display device. As shown in the drawing, the color filter substrate includes a transparent substrate. A black matrix (BM) pattern and a pigment portion are formed on the substrate. Further, a layer of a transparent conductive oxide such as ITO or IZO is formed as a transparent electrode on the pigment portion. The thickness of the transparent conductive oxide layer, which depends on the parameters such as the conductivity and transmittance required for the color filter substrate, should be at least several hundred angstroms, in general about 1300 to 1700 Å.

An alignment film is formed on the color filter substrate. A film of an organic polymer such as a polyimide resin is used as the alignment film, which is formed on the entire surface of the substrate by printing or spin coating. The film of the organic polymer has a thickness of up to about 1000 Å, in general about 600 to about 800 Å. The film of the organic polymer formed on the substrate surface is baked and, then, an aligning process such as rubbing or an energy beam irradiation is applied to the baked film so as to prepare an alignment film. The resultant alignment film is carried out a visual observation by the naked eye or an automatic optical inspecting tool to detect any defect such as a defective printing, an existence of a foreign matter, a scratch or peeling. Where a defect has been detected in the alignment film, the color filter substrate itself including the defective alignment film is transferred to the reworking process as a defective substrate. The reworking process comprises the steps of removing the defective alignment film from the color filter substrate and forming an alignment film again.

In the present invention, the defective alignment film is removed from the color filter substrate by using an apparatus 100 for removing a film of an organic polymer. In the first step, the defective substrate 50 is transferred into the chamber 101. The carry in conveyor 150 can be used for transference. The transferred substrate 50 is settled to the exposing stage 120, followed by determining the horizontal position to permit the substrate 50 to be positioned within a suitable exposing range, for instance about 5 mm or less, preferably about 1–2 mm. Further, the vertical position is determined to permit the substrate 50 to be positioned at a suitable exposing distance. After the horizontal and vertical positions are finely adjusted to permit the substrate 50 to be at a suitable exposing position, the position of the substrate 50 is fixed.

In the next step, ultraviolet radiation having a wavelength of 180 nm or less is emitted from the ultraviolet radiation emitting device 110 to expose the polyimide alignment film, which is the organic polymer film 60 to be removed, on the substrate to the ultraviolet radiation. It is possible to carry out the exposure of the substrate 50 for a time determined by experience, or it is possible to finish the irradiation at the time when the removal of the film 60 from the substrate 50 has been confirmed. The exposing time, which depends on the parameters such as the kind and thickness of the organic polymer film to be removed and the wavelength and output power of the ultraviolet radiation used for the exposure, is generally of the order of several minutes to several tens minutes. For example, where a polyimide resin alignment film having a thickness of about 700 Å is removed by exposing to the ultraviolet radiation having a wavelength of 172 nm (light source illuminance of 8 mW/cm$^2$), the exposure is carried out for about 10 minutes to about 30 minutes. The ozone generated during the ultraviolet radiation irradiation is monitored by the ozone sensor and is disposed of by the ozone; filter. Also, the by-product gases formed as a result of the decomposition of the organic polymer film are discharged out of the chamber by a suitable method.

When the ultraviolet radiation irradiation is stopped after removal of the defective alignment film, which is the film of an organic polymer, from the substrate surface, the substrate 50 fixed to the exposing stage is released from the stage, followed by transferring the substrate 50 out of the chamber 101 by, for example, the carry out conveyor 160. The polyimide alignment film is completely removed from the color filter substrate after the irradiation with the ultraviolet radiation, making it unnecessary to further wash or rinse the color filter substrate. It should also be noted that, since the pigment portion is protected by the ITO transparent conductive film or the IZO transparent conductive film, the pigment portion does not suffer from a damage such as discoloring. It follows that the color filter substrate can be reworked without deterioration.

The color filter substrate having the defective alignment film completely removed therefrom can be reworked by newly forming an alignment film thereon.

EXAMPLE 1

Prepared was a color filter substrate having ITO film formed thereon in a thickness of about 1500 Å as a transparent electrode, followed by forming a polyimide film on the ITO film in a thickness of about 700 Å so as to obtain a sample substrate.

The sample substrate thus obtained was exposed to ultraviolet radiation having a wavelength of 172 nm (light source illuminance of 7.8 mW/cm$^2$) for 30 minuets.

Figure 5:
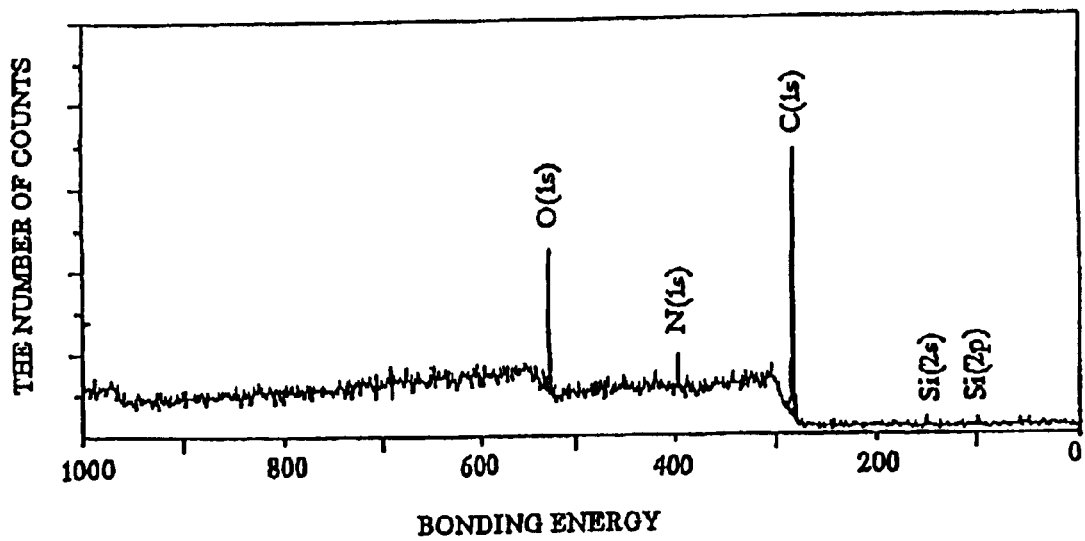
FIG. 5 shows spectra denoting the surface XPS analytical result of a color filter substrate which is being removed the polyimide film thereon in accordance with the present invention, showing the cases of (a) before exposing to ultraviolet radiation, and (b) after exposing to the ultraviolet radiation.
Figure 5:
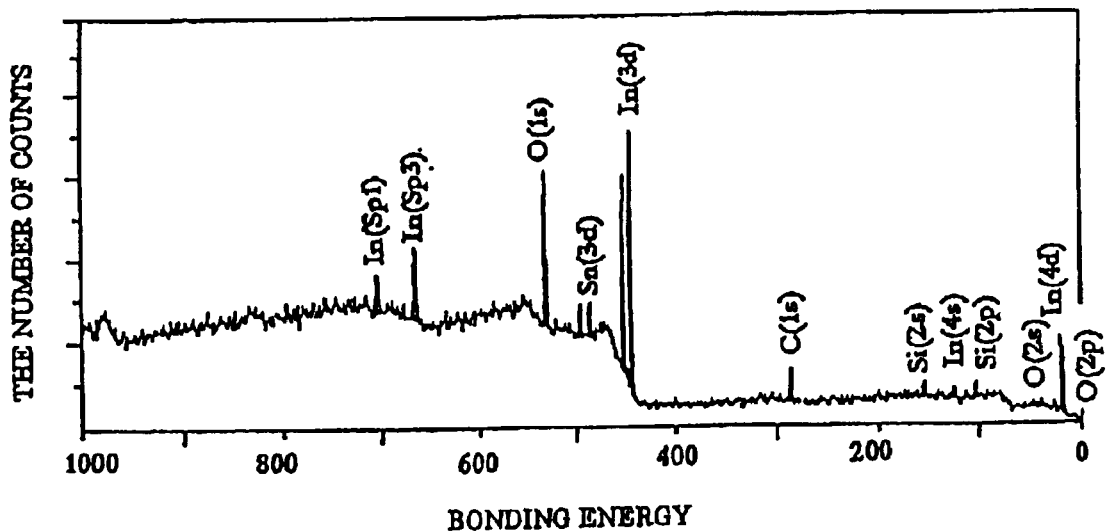

The surface of the sample substrate both before and after the exposure to ultraviolet radiation was measured by an X-ray photoelectron spectroscopy (XPS), with the result as shown in FIG. 5. Presence of atoms of each of C, N and O was recognized on the surface of the sample substrate before exposing, as shown in FIG. 5($a$), supporting that the substrate surface was covered with the polyimide resin. On the other hand, the presence of N was not recognized on the surface of the sample substrate after exposing. Also, the presence of In and Sn in addition to O was newly recognized after exposing, as shown in FIG. 5($b$). It is considered reasonable to understand that the polyimide resin was removed substantially completely by exposing to ultraviolet radiation and the underlying ITO film was exposed to the surface. Incidentally, the signal assigned to C, which is observed in FIG. 5($b$), denotes the ordinary base level and differs from the signal denoting the presence of a polyimide resin.

The surface of the sample substrate after exposing was observed with an AFM (Atomic Force Microscopy). As the result, the presence of polyimide resin was not recognized.

The sample substrate both before and after the ultraviolet radiation irradiation was examined in respect of the optical characteristics as a color filter. As the result, the transmittance and the chromaticity before exposing were found to be retained after exposing to ultraviolet radiation.

COMPARATIVE EXAMPLE 1

A sample substrate similar to that used in Example 1 was exposed to ultraviolet radiation having a wavelength of 254 nm for 30 minutes. In this case, a polyimide resin was found by a visual observation to have remained on the substrate sample after exposing to the ultraviolet radiation having a wavelength of 254 nm. Further, discoloration was observed in the pigment portion.

EXAMPLE 2

A polyimide film was newly printed as in Example 1 on the surface of the sample substrate prepared as in Example 1 after the irradiation with ultraviolet radiation so as to obtain a reworked substrate. An incomplete printing such that the newly formed polyimide film is repelled on the surface of the sample substrate after the irradiation with the ultraviolet radiation was not observed.

EXAMPLE 3

A liquid crystal display device was assembled by using the reworked substrate obtained in Example 2. Also, the liquid crystal display device thus assembled was subjected to a thermal humidity bearing (THB) test for 300 hours under the temperature of 70° C. and the relative humidity (RH) of 80%. The display characteristics such as the display fineness, brightness, gradation, contrast and view field of the assembled liquid crystal display device both before and after the THB test were found to be substantially equal to those of a liquid crystal display device prepared by using a satisfactory sample substrate which is not a reworked substrate.

EXAMPLE 4

A sample substrate similar to that used in Example 1 was exposed to ultraviolet radiation having a wavelength of 254 nm for 10 minutes with heating and maintaining the surface temperature of the substrate at around 110 degrees C. As the result, the presence of polyimide resin was not observed on the surface of the sample substrate after exposing.

EXAMPLE 5

Figure 6:
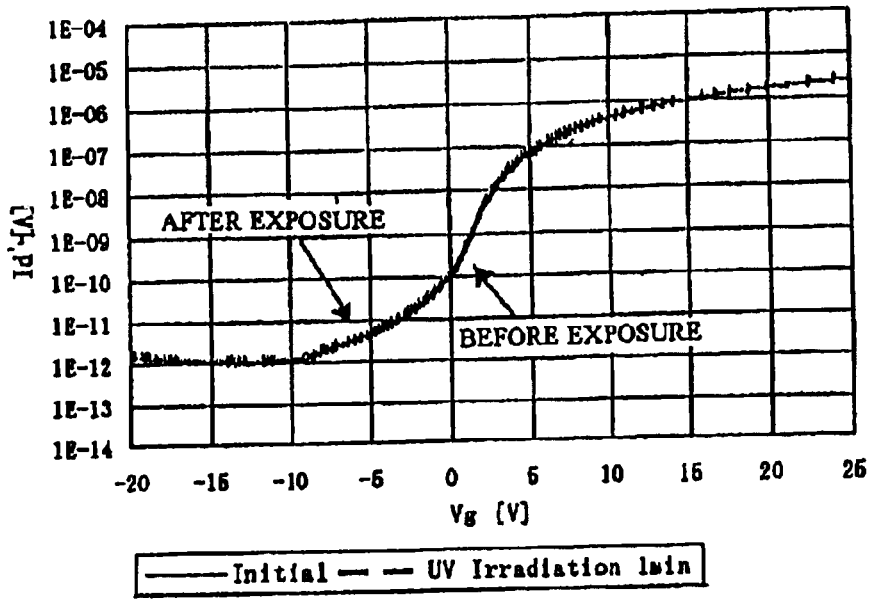
FIG. 6 shows graphs denoting the relation between the gate voltage and the drain current which shows the change of the TFT characteristics between before and after exposure to the ultraviolet radiation having a wavelength of 172 nm for (a) the array substrate structure with an ITO film and a polymer film, and for (b) the array substrate structure without an ITO film and an polymer film.
Figure 6:
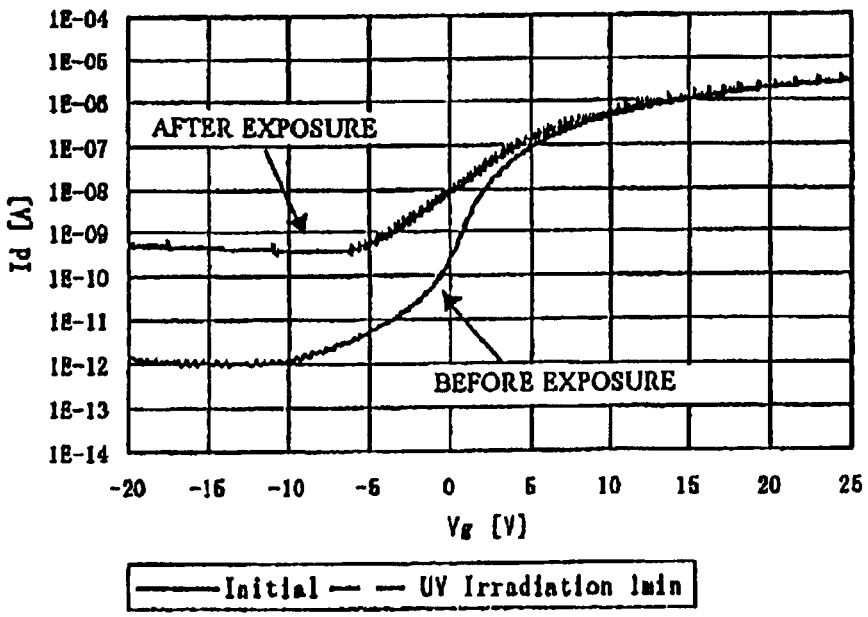

Prepared was a PFA substrate having an ITO film thereon in a thickness of about 1500 as a transparent electrode so as to obtain a sample substrate. The sample substrate was exposed to ultraviolet radiation having a, wavelength of 172 nm (light source illuminance of 7.8 mW/cm$^2$) for 1 minute. The TFT characteristics of the sample substrate both before and after the exposure to the ultraviolet radiation was evaluated by measuring the relation between gate voltage and drain current. The result is shown in FIG. 6(a). Any changes of the characteristics between before and after the exposure were not observed.

COMPARATIVE EXAMPLE 2

An array substrate similar to that used in Example 5 but not having the organic film and the ITO film was exposed to ultraviolet radiation having a wavelength of 172 nm for 1 minute. The TFT characteristics of the array substrate without organic and ITO films both before and after the exposure to the ultraviolet radiation was evaluated by measuring the relation between gate voltage and drain current. As shown in FIG. 6(b), the data after exposure indicate the changes such as lower shift of the gate threshold voltage and extremely higher drain off current than the data before exposure.

EXAMPLE 6

Prepared was a PFA substrate having ITO film formed thereon in a thickness of about 1500 Å as a transparent electrode, followed by forming a polyimide film on the ITO film in a thickness of about 700 Å so as to obtain a sample substrate. The sample substrate thus obtained was exposed to ultraviolet radiation having a wavelength of 172 nm (light source illuminance of 7.8 mW/cm$^2$) for 30 minutes. The presence of polyimide resin was not observed on the surface of the sample substrate after exposed. Also, any changes of the TFT characteristics between before and after exposure were not observed.

What is claimed is:

1. A method of manufacturing a substrate, comprising:
   preparing a substrate including a transparent electrode pattern formed on the surface thereof;
   positioning a first organic polymer film on said substrate;
   exposing said first organic polymer film to ultraviolet radiation having a wavelength not exceeding 180 nm that is not transmitted through said transparent electrode pattern so as to remove said first organic film from said substrate; and
   arranging a second organic polymer film to the substrate from which said first organic film has been removed.

2. The method according to claim 1, wherein said first organic polymer film is exposed to said ultraviolet radiation in said removing step with an output power of the ultraviolet radiation and the exposure time set sufficient for removing substantially completely the first organic polymer film.

3. The method according to claim 1, wherein said first organic polymer film comprises polyimide.

* * * * *